Aug. 16, 1955     L. D. KLEISS ET AL     2,715,647
SEPARATION AND PURIFICATION OF ANTHRACENE
Filed June 30, 1952
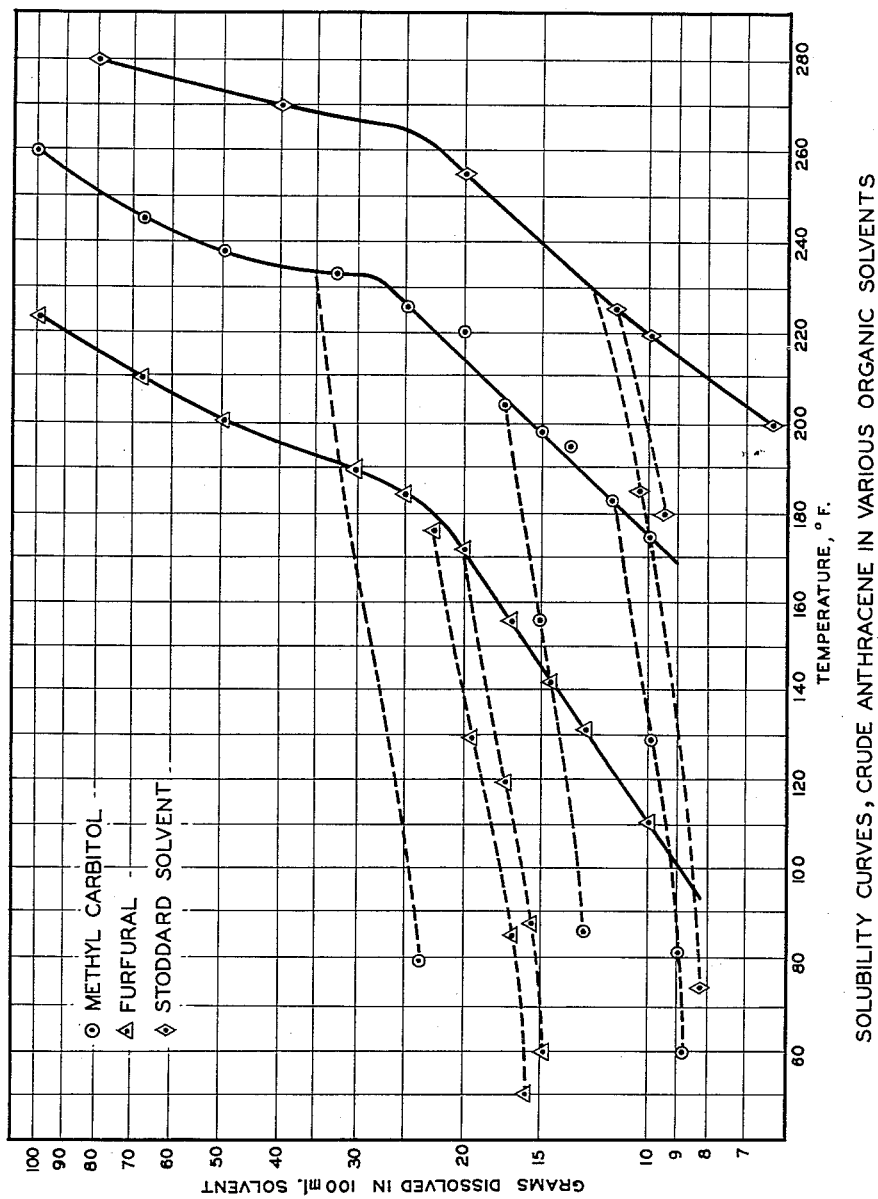
INVENTORS
L. D. KLEISS
S. J. MARWIL
BY
*Hudson & Young*
ATTORNEYS

United States Patent Office 2,715,647
Patented Aug. 16, 1955

2,715,647

SEPARATION AND PURIFICATION OF ANTHRACENE

Louis D. Kleiss and Stanley J. Marwil, Borger, Tex., assignors to Phillips Petroleum Company, a corporation of Delaware Application June 30, 1952, Serial No. 296,466

8 Claims. (Cl. 260—675)

This invention relates to the separation and purification of crystallizable derivatives of tar. In one of its aspects this invention relates to the separation and purification of anthracene from the anthracene oil cut in the distillation of coal tar. In another of its aspects this invention relates to an improved solvent for the crystallization of anthracene in the presence of carbazole, phenanthrene and other components contained in the anthracene oil cut in coal tar distillation.

Anthracene is an aromatic organic compound having the empirical formula $C_{14}H_{10}$. It is found in very small amounts, approximately one per cent, in coal tar. It is also found in the residue from the distillation of cracked petroleum products.

Anthracene as a chemical has many uses but its most important use is as a starting point in the making of alizarin, alizarin dye stuffs, and aniline dye stuffs. It is also used as a reagent in making emulsified insecticidal and fungicidal preparations. It is also an ingredient of lacquers, paints, varnishes, dopes and enamels containing various simple esters of cellulose, such as cellulose acetate and nitrocellulose, or various mixed esters of cellulose such as cellulose acetopropionate (added for the purpose of increasing the life of the film by the absorption of ultra-violet rays). Anthracene is also an ingredient of printing ink used for printing on bank notes, checks and other fiscal papers, secret numbers and marks which are rendered visible by the action of ultra-violet light rays and rays from an X-ray lamp.

As stated, an important source of anthracene is coal tar. Crude coal tar is distilled and the anthracene oil cut, boiling in the range between 572 to 662° F. is collected. This cut, which represents approximately nine per cent of the original crude coal tar, contains fluorene, phenanthrene, anthracene, carbazole, and other unidentified components. Anthracene is present in this fraction to the extent of about 10 to 15 per cent. On cooling of the anthracene oil cut, the distillate crystallizes to form a crude cake which may be separated from the oily constituent by centrifuging, filter pressing or other means. The composition of the cake which is referred to as crude anthracene, depends upon the efficiency and method of operation of the still, and the concentration of the anthracene in said cakes has ranged from approximately 5 up to 35 per cent. The usual procedure for the further concentration of anthracene involves recrystallization from a selective solvent. The most common solvents employed for this purpose are furfural and pyridine, and homologues of each. Solvent naphtha has also been commonly used. In order to obtain anthracene of 80 to 90 per cent purity, which is the minimum necessary for further use of the anthracene, it is necessary to employ a series of crystallization steps from the solvents.

We have now discovered a superior solvent from which to crystallize anthracene, comprising a monoalkyl ether of diethylene glycol containing from one to four carbon atoms in the alkyl group marketed under the trade-names "Carbitol," included among which are methyl Carbitol, Carbitol (monoethyl ether) and butyl Carbitol. A chief drawback in the use of furfural as such a solvent for crystallizing anthracene is its tendency to form a black polymer, particularly at elevated temperatures. This means that furfural must be used at low temperatures, not above 140° F., lest the polymer formed blackens the anthracene product and renders it unsuitable for dye manufacture. At these low temperatures large volumes of furfural will be used per unit of yield (4 to 6 times as much as in the case of methyl Carbitol, where only the boiling point of the solvent is a limit), and yield will be low unless the anthracene is precipitated under refrigerated conditions. Further, any furfural mother liquor adhering to the anthracene product has to be removed by flushing with another solvent or by high vacuum drying to avoid high temperatures. Also furfural in storage becomes blackened and must be purified before use.

The disadvantages of pyridine (and its homologues) include cost, which is twice as much as in the case of methyl Carbitol; it is a tertiary amine, exhibiting the chemical reactivity common to amines. This leads to high solvelt loss. Further, the odor of pyridine is piercing and objectionable, and it is difficult to handle.

It is an object of this invention to provide an improved process for the separation and purification of crystallizable derivatives of tar.

Another object of this invention is to provide an improved process for the separation and purification of anthracene from crude anthracene comprising phenanthrene, carbazole and fluorene as impurities.

A further object of this invention is to provide an improved solvent for the crystallization of anthracene in the presence of phenanthrene, carbazole, and other impurities.

Other objects and advantages of this invention will be apparent to those skilled in the art from the accompanying disclosure and discussion.

The accompanying drawing is a graphical presentation and comparison of data.

Our invention resides in the discovery that a solvent comprising a monoalkyl ether of diethylene glycol containing from one to four carbon atoms in the alkyl group commonly known by the trade name Carbitol has superior selective solvent action for anthracene when mixed with other impurities including phenanthrene and carbazole. Methyl Carbitol, a preferred solvent, which is the monomethyl ether of diethylene glycol, is a relatively inert, water-white, hygroscopic liquid of agreeable odor, completely miscible with most organic solvents and with water. It is neutral, stable in storage, stable toward most chemicals and stable toward heat. Since it is heat stable it can be recovered in compact, inexpensive solvent recovery systems. It is also moderate in cost. While methyl Carbitol has been suggested as a solvent for a wide variety of compounds including dyes, oils, fats, waxes, many natural and synthetic resins, nitrocellulose and cellulose acetate, no suggestion has been found in the prior art of the use of methyl Carbitol or compounds of this type in the purification of anthracene.

This invention involves, in a preferred embodiment, dissolving crude anthracene in a solvent comprising diethylene glycol monomethyl ether, cooling the resultant solution to crystallize therefrom anthracene crystals of improved purity and recovering said crystals from the mother liquor. More specifically, we have found that if a crude anthracene containing at least 25 weight per cent anthracene is dissolved in methyl Carbitol and the resultant solution cooled, anthracene crystals of at least 80 per cent purity can be recovered in one crystallization step. Anthracene of still greater purity can be obtained by employing more than one crystallization step.

It is also possible to employ methyl Carbitol in admixture with other solvents.

While the present invention can be applied to other purifications, it will be described in a few specific examples, more particularly in connection with the purification of crude anthracene. The following examples are not intended to limit our invention unduly but to aid in describing it and to aid those skilled in the art to practice it. Also, the advantages of our solvent over the conventional furfural solvent in the purification of anthracene are aptly demonstrated.

The crude anthracene used in the following examples had the following characteristics:

Appearance: Similar brown sugar. Oily, stains paper on contact.
Melting range: 270–330° F. (melting point pure anthracene, 422° F.; carbazole, 473° F.; phenanthrene, 290° F.).
Sublimation: about 24% sublimed at 250° F. and 1–2 mm Hg. This is about 565° F. corrected to 760 mm. (Boiling point of pure anthracene is 669° F.)
Spectroanalysis: Weight per cent
  Anthracene _____ 27.9
  Carbazole _____ 10.9
  Phenanthrene _____ 23.8

*Example 1*

A solution containing 11.4 grams of crude anthracene per 100 ml. of methyl Carbitol solvent at a temperature of 183° F. was cooled over a period of two hours to 60° F. The crystal precipitate formed was separated from the mother liquor and the crystals were hot water washed and vacuum dried at 230° F. to remove methyl Carbitol. The yield of precipitate on a washed and dried basis was 22.9 per cent. The precipitate contained 81.3 weight per cent anthracene and 0.9 per cent carbazole. The yield of anthracene obtained was 66.7 per cent.

*Example 2*

Fresh distilled furfural was used to avoid deposition of polymer on the precipitate and the discoloration thereof. A solution containing 22.5 grams of crude anthracene per 100 ml. of furfural solvent at 180° F. (which is too hot for satisfactory commercial use of furfural as discussed hereinabove) was cooled to 50° F. The precipitate obtained was separated from the mother liquor by filtration and washed with $Na_2S_2O_5$ solution and then washed with water and vacuum dried at 230° F. to remove furfural. The yield of precipitate on a washed and dried basis obtained was 29.5 per cent. This precipitate contained 75.7 weight percent anthracene, 4.5 per cent carbazole, and 4.2 per cent phenanthrene and represented an anthracene yield of 80 per cent.

*Example 3*

A solution containing 12.4 grams of crude anthracene per 100 ml. of Stoddard solvent at 230° F. was cooled to 75° F. The crystalline precipitate obtained was separated from the mother liquor by filtration and washed with pentane to remove occluded Stoddard solvent. The precipitate was then oven dried at 210° F. The yield of precipitate obtained on a washed and dried basis was 33.6%. This precipitate contained 59.6 per cent anthracene, 23.0 per cent carbazole and 2.5 per cent phenanthrene, and represented a 71.7 per cent yield of anthracene.

It can thus be seen from the foregoing example that anthracene of greater than 80 per cent purity can be obtained in a single crystallization step by employing methyl Carbitol as a solvent for the crude anthracene.

Referring to the drawing, heavy solid lines show the grams of crude anthracene employed that will completely dissolve in 100 ml. of solvent at a given temperature.

Dotted lines show behavior of partially dissolved crude anthracene. The total amount of crude anthracene present is shown by the ordinate of the intersection of a solid and a dotted line. At the temperature indicated by the abscissa of the intersection, all of this crude anthracene is soluble; as the temperature is lowered, the less soluble components will crystallize out. To find the amount still in the solution, follow the dotted line to the intersection of the temperature of cooling. The ordinate at this point will represent grams of material still in solution. Grams precipitated (purified anthracene) may be obtained by difference.

Example: Assume 35 grams of crude anthracene in 100 ml. of methyl Carbitol solvent. The heavy solid line for methyl Carbitol shows that this amount of crude anthracene will completely dissolve at 233° F. On cooling this solution to 80° F. (follow the dotted line to the left) it is found that 23.5 grams will remain in solution; therefore, 11.5 grams of the more pure anthracene are precipitated.

Those skilled in the art will readily appreciate that different solution and precipitation temperatures can be used in employing our improved solvent for the crystallization and purification of anthracene without departing from the spirit and scope of our invention.

We claim:

1. A process for the separation and purification of anthracene which comprises, dissolving crude anthracene in a solvent comprising a monoalkyl ether of diethylene glycol containing from one to four carbon atoms in the alkyl group, cooling the resultant solution to crystallize therefrom anthracene crystals of improved purity, and recovering said crystals from the mother liquor.

2. A process according to claim 1 wherein a solvent comprising diethylene glycol monomethyl ether is employed.

3. A process for the separation and purification of anthracene which comprises, dissolving crude anthracene in a solvent comprising diethylene glycol monomethyl ether, cooling the resultant solution to crystallize therefrom anthracene crystals of improved purity, recovering said crystals from the mother liquor, re-dissolving said crystals in a further amount of said solvent, cooling the second resultant solution to crystallize therefrom anthracene crystals of still greater purity, and recovering said crystals from the mother liquor.

4. A process for the separation and purification of anthracene which comprises dissolving crude anthracene in a solvent consisting essentially of diethylene glycol monomethyl ether, cooling the resultant solution to crystallize therefrom anthracene crystals of improved purity, and recovering said crystals from the mother liquor.

5. A process for the separation and purification of anthracene which comprises, dissolving crude anthracene containing at least twenty-five weight per cent anthracene in a solvent consisting essentially of diethylene glycol monomethyl ether, cooling the resultant solution to crystallize therefrom anthracene crystals of at least 80 weight per cent purity, and recovering said crystals from the mother liquor.

6. A process for the separation and purification of anthracene which comprises, dissolving crude anthracene obtained from tar and containing at least 25 weight per cent anthracene in a solvent consisting essentially of diethylene glycol monomethyl ether at a temperature within the range of 175 to 350° F., cooling the resultant solution to crystallize therefrom anthracene crystals of at least 80 weight per cent purity, and recovering said crystals from the mother liquor.

7. A process according to claim 1 wherein a solvent comprising diethylene glycol monoethyl ether is employed.

8. A process according to claim 1 wherein a solvent comprising diethylene glycol monobutyl ether is employed.

(References on following page)

References Cited in the file of this patent

UNITED STATES PATENTS

| | | |
|---|---|---|
| 1,693,713 | Jaeger | Dec. 4, 1928 |
| 1,879,090 | Cislak | Sept. 27, 1932 |
| 1,879,686 | Jaeger et al. | Sept. 27, 1932 |
| 1,908,018 | Henderson | May 9, 1933 |
| 2,407,820 | Durrum | Sept. 17, 1946 |

OTHER REFERENCES

Ferris et al., "Ind. and Eng. Chem.", vol. 23, No. 7, July 1931, pages 753–761.

Ind. Eng. Chem., vol. 36, pages 1096–1104 (1944), article by Francis.